(12) United States Patent
You

(10) Patent No.: US 11,824,624 B2
(45) Date of Patent: Nov. 21, 2023

(54) METHOD AND APPARATUS FOR RETRANSMISSION IN COMMUNICATION SYSTEM

(71) Applicant: ELECTRONICS AND TELECOMMUNICATIONS RESEARCH INSTITUTE, Daejeon (KR)

(72) Inventor: Duk Hyun You, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/124,394

(22) Filed: Mar. 21, 2023

(65) Prior Publication Data

US 2023/0231623 A1    Jul. 20, 2023

Related U.S. Application Data

(63) Continuation of application No. 17/086,724, filed on Nov. 2, 2020, now Pat. No. 11,641,235.

(30) Foreign Application Priority Data

Nov. 7, 2019    (KR) .................. 10-2019-0141772
Nov. 21, 2019    (KR) .................. 10-2019-0150338
Oct. 5, 2020    (KR) .................. 10-2020-0128186

(51) Int. Cl.
*H04B 7/185*    (2006.01)
*H04B 7/195*    (2006.01)
(Continued)

(52) U.S. Cl.
CPC ......... *H04B 7/18543* (2013.01); *H04B 7/195* (2013.01); *H04L 1/0038* (2013.01); *H04L 1/1819* (2013.01); *H04L 5/0055* (2013.01)

(58) Field of Classification Search
CPC ... H04B 7/18543; H04B 7/195; H04L 1/0038; H04L 1/1819; H04L 5/0055
See application file for complete search history.

(56) References Cited

U.S. PATENT DOCUMENTS

| 10,172,127 B2 | 1/2019 | Chatterjee et al. |
| 10,536,254 B2 | 1/2020 | Terry |
(Continued)

FOREIGN PATENT DOCUMENTS

| JP | 2019-521623 A | 7/2019 |
| KR | 10-2018-0105395 A | 9/2018 |
(Continued)

OTHER PUBLICATIONS

"3rd Generation Partnership Project;Technical Specification Group Radio Access Network;NR;Physical channels and modulation(Release 15)", 3GPP TS 38.211 V15.7.0 (Sep. 2019).
(Continued)

*Primary Examiner* — Jae Y Lee
(74) *Attorney, Agent, or Firm* — LRK PATENT LAW FIRM

(57) ABSTRACT

An operation method of a first communication node in a communication system may comprise receiving one or more transport blocks (TBs) from a second communication node based on transmission parameters in an aggregated transmission period #n; generating decoding results for the one or more TBs; generating information required for changing the transmission parameters based on the decoding results; and transmitting the required information to the second communication node, wherein n is a natural number.

10 Claims, 9 Drawing Sheets

(51) Int. Cl.
  *H04L 1/00* (2006.01)
  *H04L 1/1812* (2023.01)
  *H04L 5/00* (2006.01)

(56) References Cited

U.S. PATENT DOCUMENTS

| | | | |
|---|---|---|---|
| 2019/0037561 | A1 | 1/2019 | Jung et al. |
| 2019/0075582 | A1 | 3/2019 | Kim et al. |
| 2019/0313442 | A1 | 10/2019 | Hosseini et al. |
| 2019/0349137 | A1 | 11/2019 | Hosseini et al. |
| 2019/0373607 | A1 | 12/2019 | Zhang et al. |
| 2020/0313799 | A1 | 10/2020 | Bae et al. |
| 2021/0099260 | A1* | 4/2021 | Guan .................... H04L 1/1858 |
| 2021/0100036 | A1 | 4/2021 | Kim et al. |
| 2021/0392648 | A1* | 12/2021 | Andersson ............ H04L 5/0044 |

FOREIGN PATENT DOCUMENTS

| | | |
|---|---|---|
| KR | 10-2019-0118975 A | 10/2019 |
| WO | 2019/199051 A1 | 10/2019 |

OTHER PUBLICATIONS

"3rd Generation Partnership Project;Technical Specification Group Radio Access Network;NR;Multiplexing and channel coding(Release 15)", 3GPP TS 38.212 V15.7.0 (Sep. 2019).

"3rd Generation Partnership Project;Technical Specification Group Radio Access Network;NR;Physical layer procedures for control(Release 15)", 3GPP TS 38.213 V15.7.0 (Sep. 2019).

"3rd Generation Partnership Project;Technical Specification Group Radio Access Network;NR;Physical layer procedures for data(Release 15)", 3GPP TS 38.214 V15.7.0 (Sep. 2019).

"3rd Generation Partnership Project;Technical Specification Group Radio Access Network;NR;Medium Access Control (MAC) protocol specification(Release 15)" 3GPP TS 38.321 V15.7.0 (Sep. 2019).

"3rd Generation Partnership Project;Technical Specification Group Radio Access Network;NR;Radio Resource Control (RRC) protocol specification(Release 15)", 3GPP TS 38.331 V15.7.0 (Sep. 2019).

"3rd Generation Partnership Project;Technical Specification Group Radio Access Network;Study on New Radio (NR) to support non-terrestrial networks (Release 15)" 3GPP TR 38.811 V15.1.0 (Jun. 2019).

"3rd Generation Partnership Project;Technical Specification Group Radio Access Network;Solutions for NR to support non-terrestrial networks (NTN) (Release 16)", 3GPP TR 38.821 V0.7.0 (May 2019).

* cited by examiner

METHOD AND APPARATUS FOR RETRANSMISSION IN COMMUNICATION SYSTEM

CROSS-REFERENCE TO RELATED APPLICATIONS

This application is a continuation of U.S. patent application Ser. No. 17/086,724 filed on Nov. 2, 2020, which claims priority to Korean Patent Applications No. 10-2019-0141772 filed on Nov. 7, 2019, No. 10-2019-0150338 filed on Nov. 21, 2019, and No. 10-2020-0128186 filed on Oct. 5, 2020 with the Korean Intellectual Property Office (KIPO), the entire contents of which are hereby incorporated by reference.

BACKGROUND

1. Technical Field

The present disclosure relates to a retransmission technique in a communication network, and more specifically, to a channel adaptation control technique in a blind retransmission procedure.

2. Related Art

The communication network (e.g., a new radio (NR) communication network) using a higher frequency band (e.g., a frequency band of 6 GHz or above) than a frequency band (e.g., a frequency band of 6 GHz or below) of the long term evolution (LTE) (or, LTE-A) is being considered for processing of soaring wireless data. The NR communication network may support not only a frequency band of 6 GHz or below, but also a frequency band of 6 GHz or above, and may support various communication services and scenarios compared to the LTE communication network. For example, usage scenarios of the NR communication network may include enhanced Mobile BroadBand (eMBB), Ultra Reliable Low Latency Communication (URLLC), and Massive Machine Type Communication (mMTC).

The NR communication network may provide communication services to terminals located on the ground. Recently, the demand for communication services for planes, drones, satellites, etc. located not only on the ground but also on the non-ground is increasing, and for this purpose, technologies for a non-terrestrial network (NTN) are being discussed. The non-terrestrial network may be implemented based on NR technologies. For example, in the non-terrestrial network, communications between a satellite and a communication node (e.g., user equipment (UE)) located on the ground or a communication node (e.g., airplane, drone) located on the non-ground may be performed based on the NR technologies. In the non-terrestrial network, a satellite may perform functions of a base station in the NR communication network.

Meanwhile, in the communication network (e.g., LTE communication network, NR communication network, and non-terrestrial network), data may be transmitted based on a blind retransmission scheme. In this case, a hybrid automatic repeat request (HARQ) response (e.g., acknowledgment (ACK) or negative ACK (HACK)) for the data may not be transmitted. Since a transmitting node (e.g., base station or terminal) that has transmitted the data may not receive the HARQ response for the corresponding data, it may not accurately identify a state (e.g., throughput) of a link. Therefore, resources may be wasted in the data transmission procedure.

SUMMARY

Accordingly, exemplary embodiments of the present disclosure are directed to providing methods and apparatuses for retransmission based on statistical information with respect to data decoding results.

According to a first exemplary embodiment of the present disclosure, an operation method of a first communication node in a communication system may comprise: receiving one or more transport blocks (TBs) from a second communication node based on transmission parameters in an aggregated transmission period #n; generating decoding results for the one or more TBs; generating information required for changing the transmission parameters based on the decoding results; and transmitting the required information to the second communication node, wherein n is a natural number.

The operation method may further comprise: receiving the transmission parameters changed in consideration of the required information from the second communication node; and receiving one or more TBs from the second communication node based on the changed transmission parameters in an aggregated transmission period #n+k, wherein k is a natural number.

The operation method may further comprise, when a number of the one or more TBs is equal to a number of a plurality of slots included in the aggregated transmission period #n, transmitting a hybrid automatic repeat request (HARQ) response for the one or more TBs to the second communication node at a time indicated by the second communication node.

The required information may be transmitted to the second communication node when a feedback condition is satisfied.

The aggregated transmission period #n may include one or more slots, and the one or more TBs received in the aggregated transmission period #n may be generated based on a same data unit.

The required information may be statistical information indicating a number of decoding successes or decoding failures occurring in the aggregated transmission period #n.

The required information may be statistical information indicating a number of decoding successes or decoding failures occurring in one or more aggregated transmission periods.

The required information may be information indicating that the transmission parameters are not efficient.

The required information may be a guideline for changing the transmission parameters.

According to a second exemplary embodiment of the present disclosure, an operation method of a second communication node in a communication system may comprise: transmitting transmission parameters to a first communication node; transmitting one or more transport blocks (TBs) to the first communication node based on the transmission parameters in an aggregated transmission period #n; receiving information required for changing the transmission parameters from the first communication node; changing the transmission parameters in consideration of the required information; and transmitting the changed transmission parameters to the first communication node, wherein the required information is generated based on decoding results for the one or more TBs, and n is a natural number.

The operation method may further comprise transmitting one or more TBs to the first communication node based on the changed transmission parameters in an aggregated transmission period #n+k, wherein k is a natural number.

The required information may be received from the first communication node when a feedback condition is satisfied.

The aggregated transmission period #n may include one or more slots, and the one or more TBs transmitted in the aggregated transmission period #n may be generated based on a same data unit.

The required information may be statistical information indicating a number of decoding successes or decoding failures occurring in one or more aggregated transmission periods.

The required information may be information indicating that the transmission parameters are not efficient or a guideline for changing the transmission parameters.

According to a third exemplary embodiment of the present disclosure, an operation method of a first communication node in a communication system may comprise: receiving a first transport block (TB) from a second communication node based on transmission parameters; generating a decoding result for the first TB; generating information required for changing the transmission parameters based on the decoding result; transmitting the required information to the second communication node; generating a hybrid automatic repeat request (HARQ) response for the first TB based on the decoding result; and transmitting the HARQ response to the second communication node, wherein n is a natural number.

The operation method may further comprise: receiving the transmission parameters changed in consideration of the required information from the second communication node; and receiving a second TB from the second communication node based on the changed transmission parameters, wherein k is a natural number.

The required information may be transmitted to the second communication node when a feedback condition is satisfied.

The required information may be information indicating that the transmission parameters are not efficient or a guideline for changing the transmission parameters.

According to the present disclosure, a receiving node (e.g., base station or terminal) may transmit statistical information on data decoding results, efficiency information of transmission parameters, and/or guide information of transmission parameters to a transmitting node (e.g., terminal or base station). The transmitting node may reconfigure the transmission parameters based on the statistical information, efficiency information, and/or guide information received from the receiving node. Communications between the transmitting node and the receiving node may be performed based on the reconfigured transmission parameters. Therefore, reliability in a retransmission procedure can be guaranteed, and resource waste can be prevented. That is, the performance of the communication system can be improved.

DETAILED DESCRIPTION OF THE EMBODIMENTS

Figure 1:
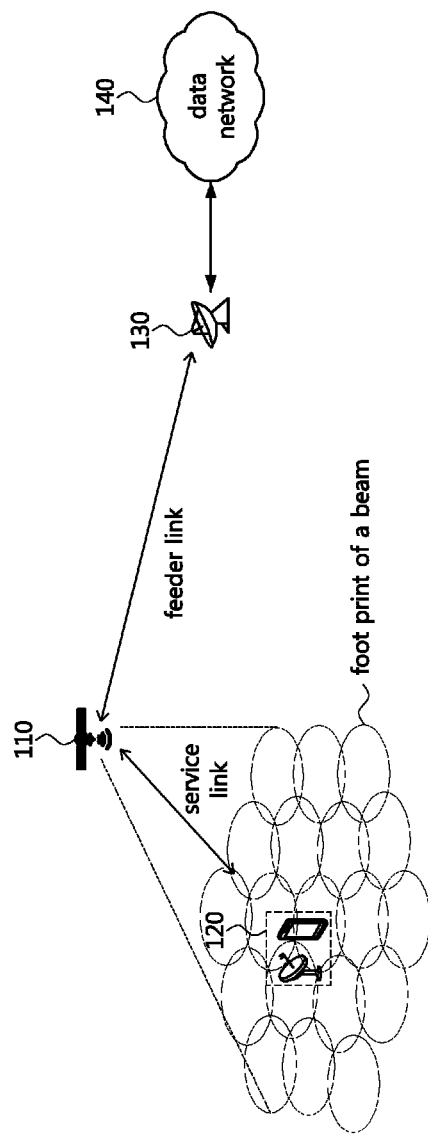
FIG. 1 is a conceptual diagram illustrating a first exemplary embodiment of a non-terrestrial network.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication network to which exemplary embodiments according to the present disclosure are applied will be described. A communication system may be a non-terrestrial network (NTN), a 4G communication network (e.g., long-term evolution (LTE) communication network), a 5G communication network (e.g., new radio (NR) communication network), or the like. The 4G communication network and 5G communication network may be classified as terrestrial networks.

The non-terrestrial network may operate based on LTE technology and/or NR technology. The non-terrestrial network may support communications in a frequency band of 6 GHz or above as well as a frequency band of 6 GHz or below. The 4G communication network may support communications in a frequency band of 6 GHz or below. The 5G communication network may support communications in a frequency band of 6 GHz or above as well as a frequency band of 6 GHz or below. The communication network to which the exemplary embodiments according to the present disclosure are applied is not limited to the contents described below, and the exemplary embodiments according to the present disclosure may be applied to various communication networks. Here, the communication network may have the same meaning as a communication system.

FIG. 1 is a conceptual diagram illustrating a first exemplary embodiment of a non-terrestrial network.

As shown in FIG. 1, a non-terrestrial network may include a satellite 110, a communication node 120, a gateway 130, a data network 140, and the like. The non-terrestrial network shown in FIG. 1 may be a non-terrestrial network based on a transparent payload. The satellite 110 may be a low earth orbit (LEO) satellite, a medium earth orbit (MEO) satellite, a geostationary earth orbit (GEO) satellite, a high elliptical orbit (HEO) satellite, or an unmanned aircraft system (UAS) platform. The UAS platform may include a high altitude platform station (HAPS).

The communication node 120 may include a communication node (e.g., user equipment (UE) or terminal) located on the ground and a communication node (e.g., airplane, drone) located on the non-ground. A service link may be established between the satellite 110 and the communication node 120, and the service link may be a radio link. The satellite 110 may provide communication services to the communication node 120 using one or more beams. A foot print of the beam of the satellite 110 may have an elliptical shape.

The communication node 120 may perform communications (e.g., downlink communication, uplink communication) with the satellite 110 using the LTE technology and/or the NR technology. The communications between the satellite 110 and the communication node 120 may be performed using an NR-Uu interface. When dual connectivity (DC) is supported, the communication node 120 may be connected to the satellite 110 as well as another base station (e.g., base station supporting the LTE and/or NR functions), and the DC operation may be performed based on the technology defined in the LTE and/or NR technical specifications.

The gateway 130 may be located on the ground, and a feeder link may be established between the satellite 110 and the gateway 130. The feeder link may be a radio link. The gateway 130 may be referred to as a 'non-terrestrial network (NTN) gateway'. Communications between the satellite 110 and the gateway 130 may be performed based on an NR-Uu interface or a satellite radio interface (SRI). The gateway 130 may be connected to the data network 140. A 'core network' may exist between the gateway 130 and the data network 140. In this case, the gateway 130 may be connected to the core network, and the core network may be connected to the data network 140. The core network may support the NR technology. For example, the core network may include an access and mobility management function (AMF), a user plane function (UPF), a session management function (SMF), and the like. Communications between the gateway 130 and the core network may be performed based on an NG-C/U interface.

Alternatively, a base station and the core network may exist between the gateway 130 and the data network 140. In this case, the gateway 130 may be connected to the base station, the base station may be connected to the core network, and the core network may be connected to the data network 140. The base station and core network may support the NR technology. Communications between the gateway 130 and the base station may be performed based on an NR-Uu interface, and communications between the base station and the core network (e.g., AMF, UPF, SMF) may be performed based on an NG-C/U interface.

Figure 2:
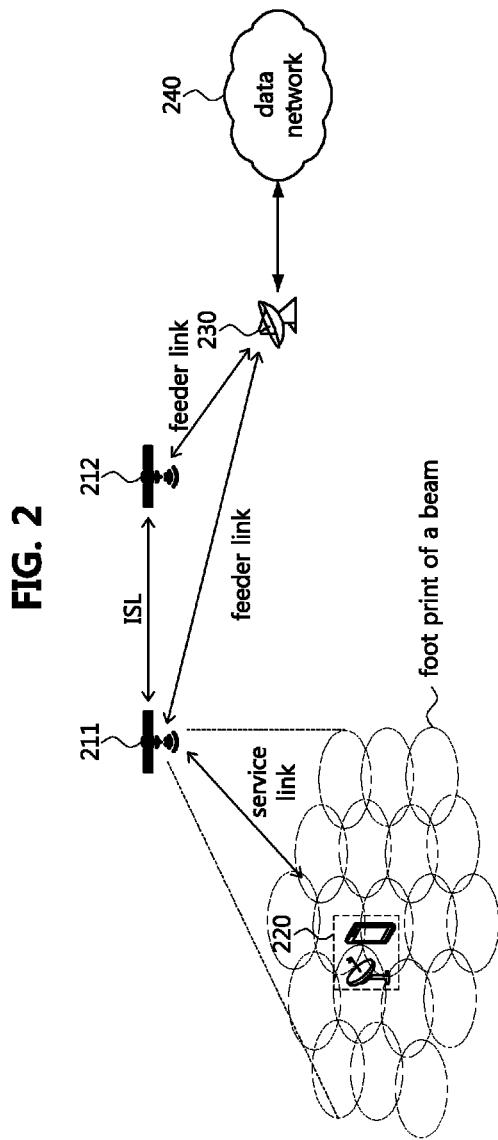
FIG. 2 is a conceptual diagram illustrating a second exemplary embodiment of a non-terrestrial network.

FIG. 2 is a conceptual diagram illustrating a second exemplary embodiment of a non-terrestrial network.

As shown in FIG. 2, a non-terrestrial network may include a satellite #1 211, a satellite #2 212, a communication node 220, a gateway 230, a data network 240, and the like. The non-terrestrial network shown in FIG. 2 may be a non-terrestrial network based on a regenerative payload. For example, each of the satellites #1 and #2 may perform a regenerative operation (e.g., demodulation operation, decoding operation, re-encoding operation, re-modulation operation, and/or filtering operation) on a payload received from another entity (e.g., communication node 220 or gateway 230) constituting the non-terrestrial network, and transmit the regenerated payload.

Each of the satellites #1 and #2 may be an LEO satellite, a MEO satellite, a GEO satellite, a HEO satellite, or a UAS platform. The UAS platform may include a HAPS. The satellite #1 211 may be connected to the satellite #2 212, and an inter-satellite link (ISL) may be established between the satellite #1 211 and the satellite #2 212. The ISL may operate in a radio frequency (RF) frequency or an optical band. The ISL may be established optionally. The communication node 220 may include a communication node (e.g., UE or terminal) located on the ground and a communication node (e.g., airplane, drone) located on the non-ground. A service link (e.g., radio link) may be established between the satellite #1 211 and the communication node 220. The satellite #1 211 may provide communication services to the communication node 220 using one or more beams.

The communication node 220 may perform communications (e.g., downlink communication, uplink communication) with the satellite #1 211 using the LTE technology and/or the NR technology. Communications between the satellite #1 211 and the communication node 220 may be performed using an NR-Uu interface. When DC is supported, the communication node 220 may be connected with the satellite #1 211 as well as another base station (e.g., base station supporting the LTE and/or NR functions), and perform the DC operation based on the technology defined in the LTE and/or NR technical specifications.

The gateway 230 may be located on the ground, a feeder link may be established between the satellite #1 211 and the gateway 230, and a feeder link may be established between the satellite #2 212 and the gateway 230. The feeder link may be a radio link. When an ISL is not established between the satellite #1 211 and the satellite #2 212, the feeder link between the satellite #1 211 and the gateway 230 may be established mandatorily.

Communications between each of the satellites #1 and #2 and the gateway 230 may be performed based on an NR-Uu interface or SRI. The gateway 230 may be connected to the data network 240. A 'core network' may exist between the gateway 230 and the data network 240. In this case, the gateway 230 may be connected to the core network, and the core network may be connected to the data network 240. The core network may support the NR technology. For example, the core network may include AMF, UPF, SMF, and the like. Communications between the gateway 230 and the core network may be performed based on an NG-C/U interface.

Alternatively, a base station and the core network may exist between the gateway 230 and the data network 240. In this case, the gateway 230 may be connected to the base station, the base station may be connected to the core network, and the core network may be connected to the data network 240. The base station and core network may support the NR technology. Communications between the gateway 230 and the base station may be performed based on an NR-Uu interface, and communications between the base station and the core network (e.g., AMF, UPF, SMF) may be performed based on an NG-C/U interface.

Meanwhile, each of the entities (e.g., satellites, communication nodes, gateways, etc.) constituting the non-terrestrial network shown in FIGS. 1 and 2 may be configured as follows.

Figure 3:
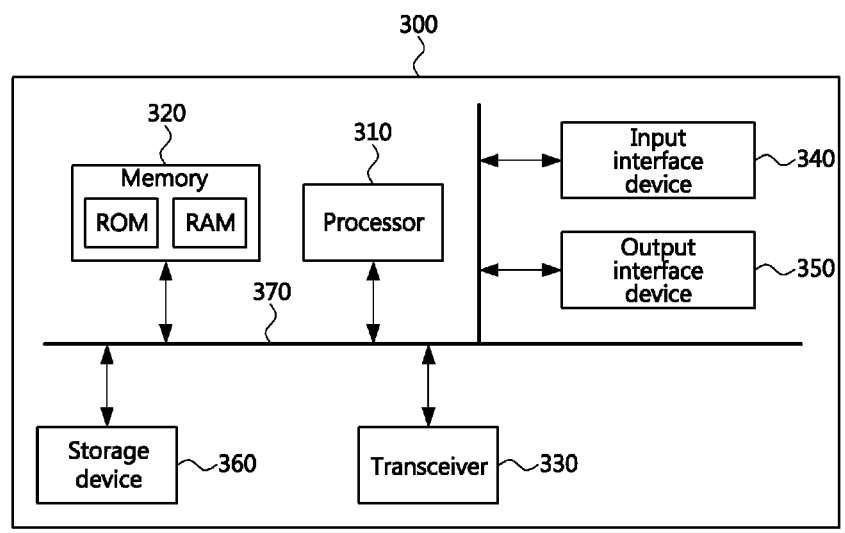
FIG. 3 is a block diagram illustrating a first exemplary embodiment of an entity constituting a non-terrestrial network.

FIG. 3 is a block diagram illustrating a first exemplary embodiment of an entity constituting a non-terrestrial network.

As shown in FIG. 3, an entity 300 may comprise at least one processor 310, a memory 320, and a transceiver 330 connected to the network for performing communications.

In addition, the entity 300 may further comprise an input interface device 340, an output interface device 350, a storage device 360, and the like. Each component included in the entity 300 may communicate with each other as connected through a bus 370.

However, each of the components included in the entity 300 may be connected through a dedicated interface or bus based on the processor 310 instead of the common bus 370. For example, the processor 310 may be connected to at least one of the memory 320, the transceiver 330, the input interface device 340, the output interface device 350, and the storage device 360 through a dedicated interface.

The processor 310 may execute a program stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may be constituted by at least one of a volatile storage medium and a non-volatile storage medium. For example, the memory 320 may comprise at least one of read-only memory (ROM) and random access memory (RAM).

Meanwhile, scenarios in the non-terrestrial network may be defined as shown in Table 1 below.

TABLE 1

| | NTN shown in FIG. 1 | NTN shown in FIG. 2 |
|---|---|---|
| GEO | Scenario A | Scenario B |
| LEO (steerable beams) | Scenario C1 | Scenario D1 |
| LEO (beams moving with satellite) | Scenario C2 | Scenario D2 |

The case when the satellite 110 is a GEO satellite (e.g., GEO satellite that supports a transparent function) in the non-terrestrial network shown in FIG. 1 may be referred to as 'scenario A'. The case when the satellites #1 and #2 are GEO satellites (e.g., GEO satellite supporting regenerative functions) in the non-terrestrial network shown in FIG. 2 may be referred to as 'scenario B'.

The case when the satellite 110 is an LEO satellite having steerable beams in the non-terrestrial network shown in FIG. 1 may be referred to as 'scenario C1'. The case when the satellite 110 is an LEO satellite having beams moving with the satellite in the non-terrestrial network shown in FIG. 1 may be referred to as 'scenario C2'. The case when the satellites #1 and #2 are LEO satellites having steerable beams in the non-terrestrial network shown in FIG. 2 may be referred to as 'scenario D1'. The case when the satellites #1 and #2 are LEO satellites having beams moving together with the satellite in the non-terrestrial network shown in FIG. 2 may be referred to as 'scenario D2'.

Parameters for the scenarios defined in Table 1 may be defined as shown in Table 2 below.

TABLE 2

| | Scenarios A and B | Scenarios C and D |
|---|---|---|
| Altitude | 35,786 km | 600 km<br>1,200 km |
| Spectrum (service link) | | <6 GHz (e g., 2 GHz)<br>>6 GHz (e g., DL 20 GHz, UL 30 GHz) |

TABLE 2-continued

|  | Scenarios A and B | Scenarios C and D |
|---|---|---|
| Maximum channel bandwidth capability (service link) | 30 MHz for band < 6 GHz 1 GHz for band > 6 GHz | |
| Maximum distance between a satellite and a communication node (e.g., UE) at a minimum elevation angle | 40,581 km | 1,932 km (600 km altitude) 3,131 km (1,200 km altitude) |
| Maximum round trip delay (RTD) (propagation delay only) | Scenario A: 541.46 ms (service and feeder links) Scenario B: 270.73 ms (service link only) | Scenario C: (transparent payload: service and feeder links) 25.77 ms (600 km altitude) 41.77 ms (1200 km altitude) Scenario D: (regenerative payload: service link only) 12.89 ms (600 km altitude) 20.89 ms (1200 km altitude) |
| Maximum differential delay within a cell | 10.3 m | 3.12 ms (600 km altitude) 3.18 ms (1200 km altitude) |
| Service link | 3GPP defined NR | |
| Feeder link | 3GPP or non-3GPP defined radio interface | |

In addition, in the scenarios defined in Table 1, delay constraints may be defined as shown in Table 3 below.

TABLE 3

|  | Scenario A | Scenario B | Scenario C1-2 | Scenario D1-2 |
|---|---|---|---|---|
| Satellite altitude | 35,786 km | | 600 km | |
| Maximum RTD of a radio interface between a base station and a UE | 541.75 ms (worst case) | 270.57 ms | 28.41 ms | 12.88 ms |
| Minimum RTD of a radio interface between a base station and a UE | 477.14 ms | 238.57 ms | 8 ms | 4 ms |

Hereinafter, retransmission methods based on statistical information on decoding results of data will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

The retransmission method (e.g., retransmission mechanism) may be designed assuming a specific range of round trip time (RTT), and the retransmission method may depend on the RTT. Accordingly, when the RTT is changed, a new retransmission method may be required. Referring to the scenarios described in Table 3, the RTT (e.g., RTD) in the non-terrestrial network may be longer than the RTT in the conventional communication network (e.g., LTE communication network, NR communication network). Therefore, for the non-terrestrial network, a new retransmission method that is tolerable to a delay may be required instead of the retransmission method designed based on a relatively short RTT.

As a new retransmission method, a blind retransmission method (e.g., multiple retransmission method) may be used.

In the blind retransmission method, data may be transmitted in slot(s) aggregated according to a slot aggregation scheme, and a HARQ response (e.g., acknowledgment (ACK) or negative ACK (NACK)) for the corresponding data may not be transmitted. That is, a feedback operation of the HARQ response may be disabled. When the blind retransmission method is used, there may not be a HARQ response for the data. In this case, since the transmitting node (e.g., base station or terminal) may not know a state (e.g., throughput) of the link, resources for retransmission of the data may be wasted. The above-described slot aggregation scheme may be applied not only to the non-terrestrial network, but also to other communication networks (e.g., LTE communication system, NR communication system). In exemplary embodiments, the transmitting node may be a communication node that transmits data, and the receiving node may be a communication node that receives data. For example, when the transmitting node is a base station, the receiving node may be a terminal. Alternatively, when the transmitting node is a terminal, the receiving node may be a base station or another terminal.

Figure 4:
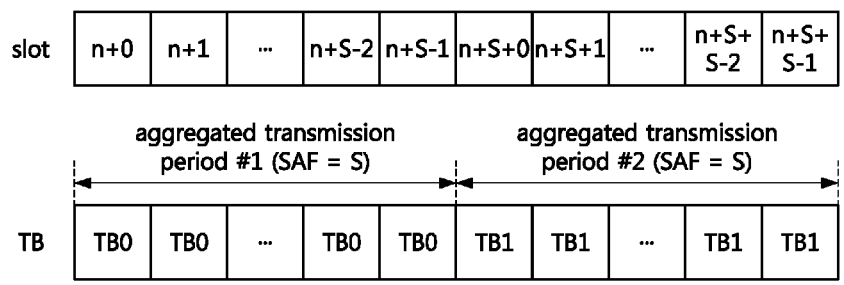
FIG. 4 is a conceptual diagram illustrating a first exemplary embodiment of a blind retransmission method in a communication system.

FIG. 4 is a conceptual diagram illustrating a first exemplary embodiment of a blind retransmission method in a communication system.

As shown in FIG. 4, the blind retransmission method may be performed based on the slot aggregation scheme, and the feedback operation of the HARQ response may not be performed. The transmitting node may repeatedly transmit the same transport block (TB) (e.g., TB composed of the same data unit) in aggregated slots (e.g., S slots). Here, S may be a natural number. The number of aggregated slots may be indicated by a slot aggregation factor (SAF). The repetitive transmission operation of the same TB may be performed in unit of the SAF (e.g., aggregated transmission period). In one aggregated transmission period, the same TB may be transmitted more than once, and the same TB including different information may be transmitted in each slot.

That is, transmitted information may be changed for each slot in one aggregated transmission period. The transmitted information may be rate-matched information selected from a circular buffer. The information selected from the circular buffer may be determined according to a redundancy version (RV). In the aggregated transmission period, a value of an RV applied to a current TB may be determined based on a value of an RV applied to an initial transmission TB and a transmission order of the current TB. The initial transmission TB may be a TB transmitted through the first slot in the aggregated transmission period.

When the slot aggregation scheme is used, a HARQ response may be generated based on a result of decoding data performed by the receiving node (e.g., base station or terminal). In this case, the HARQ response may include a decoding result for each of all TBs received in the aggregated transmission period. As another example, instead of one TB, one HARQ response may be generated for all TBs received in the aggregated transmission period. That is, the HARQ response may be generated on an aggregated transmission period basis. One HARQ response may be generated by bundling decoding results for all TBs received in one aggregated transmission period. For example, when cyclic redundancy check (CRC) results for all TBs received in one aggregated transmission period indicate CRC failures, the receiving node may transmit NACK to the transmitting node as the HARQ response. When the CRC result(s) for one or more TB(s) received in one aggregated transmission period indicate CRC OK, the receiving node may transmit ACK to the transmitting node as the HARQ response.

Figure 5:
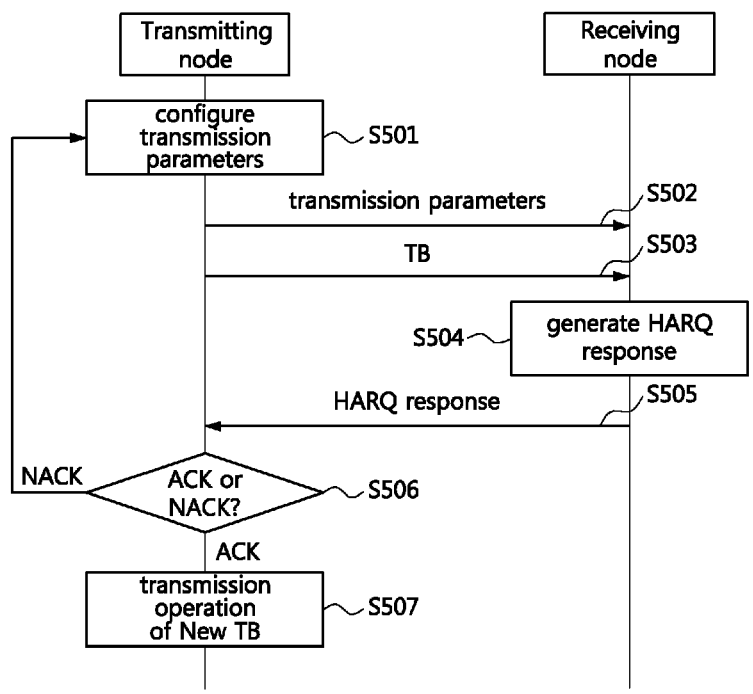
FIG. 5 is a sequence chart illustrating a first exemplary embodiment of a retransmission method in a communication system.

FIG. 5 is a sequence chart illustrating a first exemplary embodiment of a retransmission method in a communication system.

As shown in FIG. 5, a communication system (e.g., LTE communication system, NR communication system, non-terrestrial network) may include a transmitting node and a receiving node. The transmitting node may be a communication node that transmits data, and the receiving node may be a communication node that receives the data. Each of the transmitting node and the receiving node may be configured identically or similarly to the communication node 300 shown in FIG. 3.

The transmitting node may configure transmission parameters (S501). The transmission parameters may include an effective code rate related parameter and/or a HARQ related parameter. The transmitting node may transmit the transmission parameters to the receiving node (S502). The transmission parameters may be transmitted through one or a combination of two or more of system information, radio resource control (RRC) message, medium access control (MAC) message, and physical (PHY) message. The system information may be a master information block (MIB) and/or system information block (SIB). The MAC message may be a message including a MAC control element (CE). The PHY message may be control information, and the control information may be downlink control information (DCI), uplink control information (UCI), and/or sidelink control information (SCI).

The receiving node may receive the transmission parameters from the transmitting node. The transmitting node may transmit a transport block (TB) to the receiving node based on the transmission parameters (S503). Here, the transmission operation may be performed on a TB basis. The receiving node may perform an operation of receiving the TB based on the transmission parameters. For example, the receiving node may generate a HARQ response (e.g., ACK or NACK) based on a result of decoding the TB (S504). The receiving node may transmit the HARQ response to the transmitting node (S505).

The transmitting node may receive the HARQ response from the receiving node, and may identify whether the HARQ response is ACK or NACK (S506). When the HARQ response is ACK, the transmitting node may determine that the TB transmitted in the step S503 has been successfully received by the receiving node, and may perform a transmission operation of a new TB (S507). Alternatively, if a new TB does not exist in the transmitting node, the transmission operation of the TB may be terminated.

On the other hand, when the HARQ response is NACK, the transmitting node may reconfigure the transmission parameters by performing the step S501 again, and may perform a retransmission operation of the TB based on the reconfigured transmission parameters. That is, the transmitting node may perform a rate control operation on the retransmission TB based on the HARQ response (e.g., NACK). The transmission parameters for the retransmission TB may be set differently from the transmission parameters for the initial transmission TB.

Figure 6:
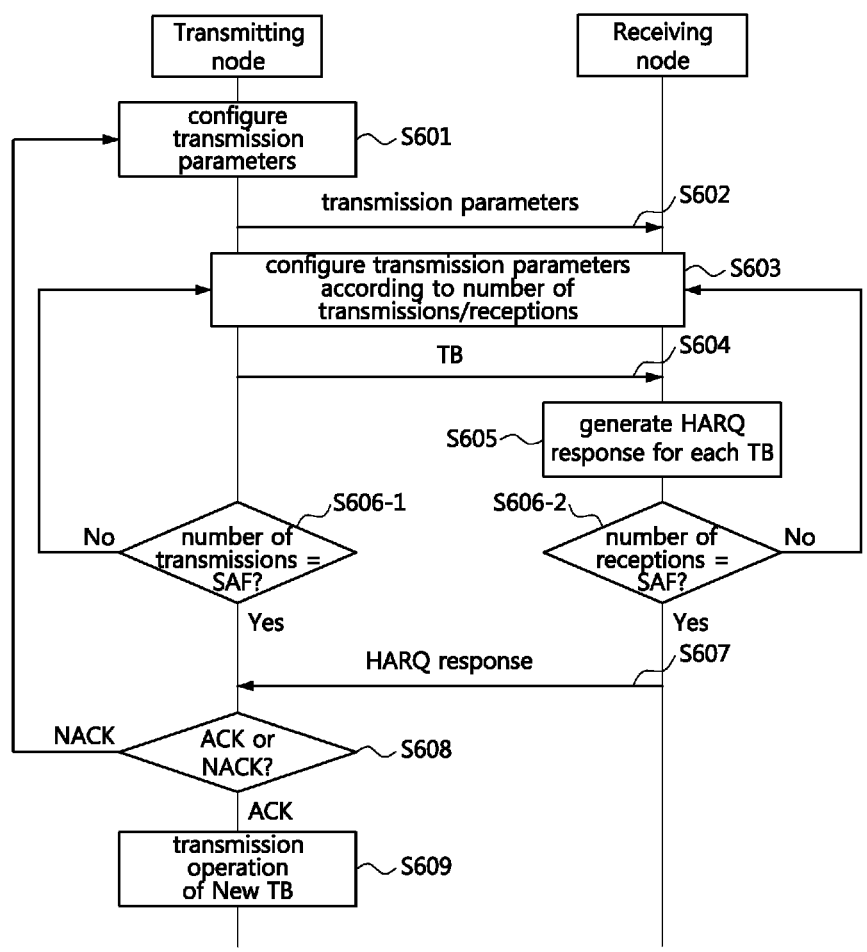
FIG. 6 is a sequence chart illustrating a second exemplary embodiment of a retransmission method in a communication system.

FIG. 6 is a sequence chart illustrating a second exemplary embodiment of a retransmission method in a communication system.

As shown in FIG. 6, a communication system (e.g., LTE communication system, NR communication system, and non-terrestrial network) may include a transmitting node and a receiving node. Each of the transmitting node and the receiving node may be configured identically or similarly to the communication node 300 shown in FIG. 3. The retransmission method shown in FIG. 6 may be performed based on the slot aggregation scheme. For example, the same TB (e.g., TB composed of the same data unit) may be repeatedly transmitted in an aggregated transmission period (e.g., slots indicated by the SAF). The TBs repeatedly transmitted in one aggregated transmission period may have different RVs.

The transmitting node may configure transmission parameters (S601). The transmission parameters may include an effective code rate related parameter and/or a HARQ related parameter. The transmitting node may transmit the transmission parameters to the receiving node (S602). The transmission parameters may be transmitted through one or a combination of two or more of system information, RRC message, MAC message, and PHY message. The receiving node may receive the transmission parameters from the transmitting node. The transmission parameters may be configured (e.g., updated) according to the number of transmissions or receptions of the TB (S603). For example, the transmitting node may configure the transmission parameters according to the number of transmissions of the TB in one aggregated transmission period, and the receiving node may configure the transmission parameters according to the number of receptions of the TB in one aggregated transmission period.

The transmitting node may transmit the TB to the receiving node based on the transmission parameters (S604). The transmitting node may repeatedly transmit the TB by the number indicated by the SAF in the aggregated transmission period. For example, the transmitting node may compare the number of transmissions of the TB in the aggregated transmission period and the SAF (S606-1). If the number of transmissions of the TB in the aggregated transmission period is less than the SAF, the transmitting node may reconfigure the transmission parameters according to the number of transmissions of the TB (S603), and transmit the TB to the receiving node based on the reconfigured transmission parameters (S604).

On the other hand, if the number of transmissions of the TB in the aggregated transmission period is equal to the SAF, the transmitting node may perform the steps after the step S606-1. For example, when a HARQ feedback operation is disabled, the transmitting node may perform a transmission operation of a new TB (S609). On the other hand, when the HARQ feedback operation is enabled, the transmitting node may receive a HARQ response from the receiving node and may operate based on the received HARQ response.

Meanwhile, the receiving node may perform an operation of receiving the TB based on the transmission parameters. For example, the receiving node may generate a HARQ response (e.g., ACK or NACK) based on a decoding result of the TB (S605). The step S605 may be performed on a TB basis. The receiving node may compare the number of receptions of the TB in the aggregated transmission period and the SAF (S606-2). If the number of receptions of the TB in the aggregated transmission period is less than the SAF, the receiving node may reconfigure the transmission parameters according to the number of receptions of the TB (S603), and may perform an operation of receiving the TB based on the reconfigured transmission parameters. On the other hand, if the number of receptions of the TB in the aggregated transmission period is equal to the SAF, the receiving node may transmit a HARQ response for all TBs received in the aggregated transmission period to the transmitting node (S607). The step S607 may be performed when the HARQ feedback operation is enabled. When the HARQ feedback operation is disabled, the receiving node may perform a reception operation of a new TB without performing the step S607.

The HARQ response transmitted in the step S607 may include a decoding result for each of all TBs received in the aggregated transmission period. As another example, when the decoding results for all TBs received in the aggregated transmission period indicate failures, the HARQ response transmitted in the step S607 may be NACK. As another example, when the decoding result for at least one TB received in the aggregated transmission period is successful, the HARQ response transmitted in the step S607 may be ACK.

The transmitting node may receive the HARQ response from the receiving node, and may identify whether the HARQ response is ACK or NACK (S608). When the HARQ response is ACK, the transmitting node may determine that the TB transmitted in the step S604 has been successfully received by the receiving node, and may perform a transmission operation of a new TB in the next aggregated transmission period (S609). On the other hand, when a new TB does not exist in the transmitting node, the transmission operation of the TB may be terminated.

On the other hand, when the HARQ response is NACK, the transmitting node may reconfigure the transmission parameters by performing the step S601 again, and may perform a retransmission operation of the TB based on the reconfigured transmission parameters. That is, the transmitting node may perform a rate control operation on the retransmission TB based on the HARQ response (e.g., NACK). The transmission parameters for the retransmission TB may be configured differently from the transmission parameters for the initial transmission TB. The TB retransmission operation may be performed in a new aggregated transmission period.

Meanwhile, when the retransmission procedure is performed based on the slot aggregation scheme in the non-terrestrial network, the HARQ response may not be fed back. That is, the step S607 may not be performed in the exemplary embodiment shown in FIG. 6. In this case, in order to ensure reliability, the number of retransmissions of the TB may be preconfigured. Since the HARQ response is not fed back, the HARQ response may not be used to determine whether to retransmit the TB. Due to this limitation, the number of retransmissions of the TB may be preconfigured before transmission of the TB, and the TB may be transmitted by the preconfigured retransmission number. In the TB retransmission procedure, transmission parameters other than some transmission parameters (e.g., RV) may be applied equally to the initial transmission TB and the retransmission TB.

When there is no HARQ response, transmission parameters corresponding to a current state (e.g., channel state, reception state, etc.) may not be determined. For example, the transmission parameters may be configured to satisfy a reliability higher than a reliability corresponding to the current state, and in this case, resources may be wasted. Alternatively, the transmission parameters may be configured to satisfy a reliability lower than the reliability corresponding to the current state, and in this case, the transmission may fail.

When the slot aggregation scheme is used, one HARQ response may be generated by bundling a decoding result for each of all TBs received in one aggregated transmission period. The one HARQ response may be ACK or NACK for the entire aggregated transmission period, and may not indicate ACK or NACK for each of the TBs received in one aggregated transmission period. Therefore, the transmitting node may not be able to identify the number of ACKs generated in one aggregated transmission period based on the one HARQ response. In this case, the transmitting node may not identify whether the transmission parameters have an appropriate reliability corresponding to the current state, a lower reliability than the reliability corresponding to the current state, or a higher reliability than the reliability corresponding to the current state.

Figure 7:
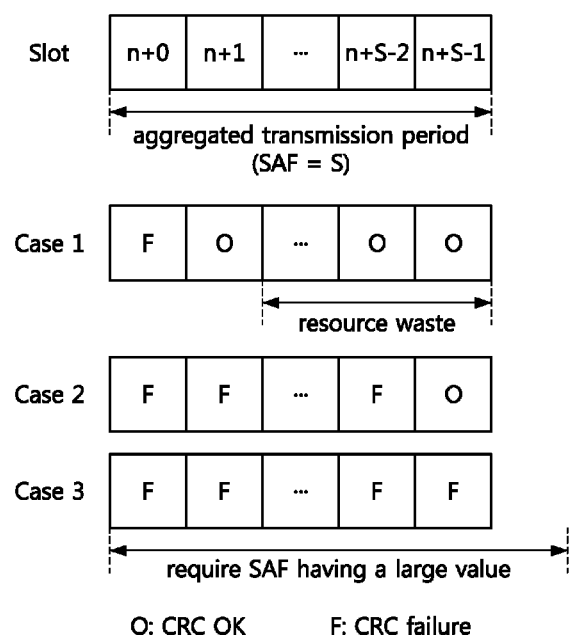
FIG. 7 is a conceptual diagram illustrating a first exemplary embodiment of a SAF required according to a result of decoding data in a communication system.

FIG. 7 is a conceptual diagram illustrating a first exemplary embodiment of a SAF required according to a result of decoding data in a communication system.

As shown in FIG. 7, an SAF may be one of transmission parameters. The SAF may indicate S, and S may be a natural number. In a case 3, an SAF smaller than the SAF corresponding to the current state may be used, and accordingly, ACK may not occur in one aggregated transmission period. Meanwhile, in a case 2, an appropriate SAF corresponding to the current state may be used. In this case, one ACK may occur in one aggregated transmission period. Finally, in a case 1, an SAF larger than the SAF corresponding to the current state may be used. In this case, two or more decoding successes may occur in one aggregated transmission period. In this case, one HARQ response in one aggregated transmission period may be determined as ACK, and accordingly, the case 2 may not be distinguished from the case 3 from the perspective of the transmitter. TB transmissions other than TB transmissions related to the first decoding success in one aggregated transmission period may be unnecessary. Resources (e.g., radio resources) may be wasted due to unnecessary TB transmissions. However, since the HARQ response for one aggregated transmission period indicates a success of the entire aggregated transmission period as one HARQ response and does not indicate the resources wasted by the current transmission, it is not easy to reduce the wasted resources.

Meanwhile, in exemplary embodiments, the transmission parameters may include an effective code rate related parameter and/or a HARQ related parameter (e.g., retransmission-related parameters). The effective code rate related parameter may include one or more parameters defined in Table 4 below, and the HARQ related parameter may include one or more parameters defined in Table 5 below.

TABLE 4

| Effective code rate related parameters | | |
|---|---|---|
| Aggregation factor | | |
| Number of transmissions | | |
| Number of layers | | |
| TB size | | |
| Resource mapping information (e.g., number of REs) | Number of RBs (e.g., number of subcarriers) | Mapping type Bitmap Bandwidth part (BWP) start, BWP size Resource indication value (RIV) |
| | Number of symbols (e.g., start and length indicator value (SLIV)) | |
| MCS index | Target code rate Modulation order Spectrum efficiency | |
| Number of overheads | | |

TABLE 5

| HARQ related parameters |
|---|
| HARQ process ID |
| Number of HARQ processes |
| HARQ process number |
| Redundancy version (RV) |
| New data indicator (NDI) |
| Code block group transmission information (CBGTI) |
| Code block group flushing out information (CBGFI) |

In order to solve the above problem, retransmission methods may be performed as follows.

1) Uplink Transmission Procedure

In the uplink transmission procedure, the decoding result and the HARQ response may be generated by the base station (e.g., reception unit included in the base station), and the transmission parameters may be configured by the base station. Therefore, even when the HARQ operation (e.g., feedback operation of the HARQ response) is disabled in the uplink transmission procedure, the base station may generate the HARQ response (e.g., ACK or NACK) based on a decoding result for uplink data received from the terminal, and configure the transmission parameters by using the decoding result.

When the transmission parameters are changed, the base station may inform the terminal of the changed transmission parameters. For example, the base station may transmit the changed transmission parameters to the terminal through one or a combination of two or more of system information, RRC message, MAC message, and PHY message. In order to quickly transmit the transmission parameters, a MAC message and/or PHY message may be used. In this case, specific transmission parameters (e.g., SAF) may be transmitted through a MAC message and/or PHY message.

2) Downlink Transmission Procedure

In the downlink transmission procedure, the decoding result and the HARQ response may be generated by the terminal (e.g., reception unit included in the terminal), and the transmission parameters may be configured by the base station. When the HARQ response is not transmitted to the base station, the HARQ response may not be used to determine the transmission parameters.

2-1) Method of Substituting the HARQ Response

When channel reciprocity is established, downlink performance (e.g., downlink channel state) may be estimated based on uplink performance (e.g., uplink channel state). Accordingly, the base station may estimate a HARQ response for downlink data (hereinafter, referred to as 'downlink HARQ response') based on a HARQ response for uplink data (hereinafter, referred to as 'uplink HARQ response'). In this case, the base station may simply determine that the downlink HARQ response is the same as the uplink HARQ response. Alternatively, when an uplink metric is similar to a downlink metric, the base station may regard the uplink HARQ response as the downlink HARQ response.

When the uplink metric is not similar to the downlink metric, the base station may predict the downlink HARQ response using the uplink HARQ response. Here, the metric may be one or more of an effective code rate, spectrum efficiency, and channel stat information (CSI) feedback information. Information other than the above-described information may be used as the metric. Also, the above procedure may be applied by substituting the HARQ response with a decoding result.

2-2) Method of Generating Statistical Information by Statistically Collecting Decoding Results, and Feeding Back Statistical Information The terminal may receive one or more TBs from the base station, may generate a decoding result for each of the one or more TBs, and may generate statistical information on the decoding results. The statistical information may include at least one of a probability moment value such as an average and a deviation, minimum value, maximum value, average value, and difference for M transmissions and/or a time duration N. The probability moment value used as the statistical information may be preconfigured. When M or more samples (e.g., TBs) are received, the statistical information may be generated. Alternatively, when samples corresponding to the time duration N are obtained, the statistical information may be generated.

For example, the base station may determine a value used as the statistical information, and inform the terminal of the determined value using one or a combination of two or more of system information, RRC message, MAC message, and PHY message. Alternatively, the terminal may determine a value used as the statistical information, and inform the base station of the determined value using one or a combination of two or more of RRC message, MAC message, and PHY message.

M and N may be preconfigured. M may be a natural number. N may be a rational number, and a time unit may be microsecond (μs), millisecond (ms), or second (s). For example, the base station may determine M and/or N, and may inform the terminal of M and/or N using one or a combination of two or more of system information, RRC message, MAC message, and PHY message. Alternatively, the terminal may determine M and/or N, and may inform the base station of M and/or N by using one or a combination of two or more of RRC message, MAC message, and PHY message.

The statistical information on the decoding results may include one or more information elements defined in Table 6 below. The information element(s) used as the statistical information may be preconfigured. For example, the base station may determine the information element(s) used as the statistical information, and inform the terminal of the determined information element(s) by using one or a combination of two or more of system information, RRC message, MAC message, and PHY message. Alternatively, the terminal may determine the information element(s) used as the statistical information, and inform the base station of the determined information element(s) by using one or a combination of two or more of RRC message, MAC message, and PHY message.

TABLE 6

Statistical information

Statistical information indicating the position in which the first decoding success occurring in one or more aggregated transmission periods (e.g., an average of indexes of slots where the first CRC OK occurs, an average of positions associated of TBs with the first CRC OK)
Statistical information indicating the number of decoding successes occurring in one or more aggregated transmission periods (e.g., average number)
Statistical information indicating the number of decoding failures occurring in one or more aggregated transmission periods (e.g., average number)
Statistical information indicating the ratio of decoding success (or decoding failure) occurring in one or more aggregated transmission periods (e.g., average decoding success rate or average decoding failure rate)
Information indicating that the effective code rate is too low (e.g., information indicating whether the average number of decoding successes occurring in one or more aggregated transmission periods exceeds 1 (or exceeds 1.5 or 2))
Information indicating that the effective code rate is too high (e.g., information indicating whether the average number of decoding failures occurring in one or more aggregated transmission periods exceeds (SAF-1) (or exceeds (SAF-0.5) or is equal to the SAF))
Information indicating the number of aggregated transmission periods
Information indicating the number of TBs
Transmission parameters (e.g., effective code rate rated parameter and/or HARQ related parameter)

(1) Statistical Information Feedback Method

The terminal may generate the statistical information including one or more information elements defined in Table 6, and may transmit the statistical information to the base station through one or a combination of two or more of RRC message, MAC message, and PHY message. The information element(s) included in the statistical information may be preconfigured by the base station or the terminal. The statistical information may be transmitted from the terminal to the base station at a preconfigured transmission time. The transmission time of the statistical information may be preconfigured. For example, the base station may determine the transmission time of the statistical information, and inform the terminal of the determined transmission time through one or a combination of two or more of system information, RRC message, MAC message, and PHY message.

Alternatively, the terminal may determine the transmission time of the statistical information, and may inform the base station of the determined transmission time through one or a combination of two or more of system information, RRC message, MAC message, and PHY message. In this case, the base station may reconfigure the transmission parameters in consideration of the transmission time configured by the terminal.

The terminal may transmit information elements required for configuring the transmission parameters to the base station. In this case, the base station may determine whether to apply the information elements received from the terminal. When it is necessary to apply the information elements received from the terminal, the base station may determine the efficiency of the transmission parameters, and may change the transmission parameters according to a result of the determination of the efficiency.

(2) Feedback Method of Information Indicating Whether Transmission Parameters are Efficient The terminal may generate the statistical information on the decoding results. Thereafter, the terminal may determine efficiency of the transmission parameters, and transmit information indicating whether the transmission parameters are efficient (hereinafter referred to as 'efficiency information') to the base station through one or a combination of one or more of RRC message, MAC message, and PHY message. The base station may receive the efficiency information from the terminal, and may reconfigure the transmission parameters in consideration of the efficiency information.

For example, the metric used to determine the efficiency of the transmission parameters may be the statistical information (e.g., average number) of the number of decoding successes occurring in one or more aggregated transmission periods. In this case, if the average number of decoding successes occurring in the aggregated transmission period exceeds 1, the terminal may determine that the transmission parameters need to be changed. That is, the terminal may determine that the transmission parameters are not efficient and may transmit efficiency information indicating that the transmission parameters are not efficient to the base station. Here, it may be necessary to change in a direction in which the effective code rate increases. For example, it may be necessary to change in a direction in which the aggregation factor decreases among the effective code rate related parameters, and the corresponding information may be indicated by the efficiency information. Here, conditions for determining that the transmission parameters need to be changed may be variously changed. For example, the conditions may include 'whether the average number of decoding successes exceeds 1.5', 'whether the average number of decoding successes exceeds 2 or more', and/or the like.

When the average number of decoding successes occurring in the aggregated transmission period is 1, the terminal may determine that the transmission parameters are efficient and may transmit efficiency information indicating that the transmission parameters are efficient to the base station. Alternatively, since there is no need to change the transmission parameters, the terminal may not perform an additional operation. Here, the conditions for determining that the transmission parameters need to be changed may be variously changed. For example, the conditions may include 'whether the average number of decoding successes is between 0.5 and 1.5', and/or the like.

When the average number of decoding successes in the aggregated transmission period is less than 1, the terminal may determine that the transmission parameters need to be changed. That is, the terminal may determine that the transmission parameters are not efficient and may transmit efficiency information indicating that the transmission parameters are not efficient to the base station. Here, it may be necessary to change the transmission parameters in a direction in which the effective code rate decreases. For example, it may be necessary to change in a direction in which the aggregation factor increases among effective code rate related parameters, and the corresponding information may be indicated by the efficiency information. Here, the conditions for determining that the transmission parameters need to be changed may be variously changed. For example, the conditions may include 'whether the average number of decoding successes is less than 0.5', 'whether no decoding success occurs', and/or the like.

The above-described exemplary embodiment may be performed for not only the aggregation factor but also other parameters. In this case, an execution order or priority may be preconfigured. For example, the base station may determine the execution order or priority of the efficiency information generation/transmission operation, and inform the terminal of the determined execution order or the determined priority through one or a combination of one or more of system information, RRC message, MAC message, and PHY message. Alternatively, the terminal may determine the execution order or priority of the efficiency information generation/transmission operation, and inform the base station of the determined execution order or the determined priority through one or a combination of two or more of RRC message, MAC message, and PHY message.

Meanwhile, the transmission time of the efficiency information may be preconfigured. For example, the base station may determine the transmission time of the efficiency information, and may inform the terminal of the determined transmission timing through one or a combination of two or more of system information, RRC message, MAC message, and PHY message. Alternatively, the terminal may determine the transmission time of the efficiency information, and may inform the base station of the determined transmission time through one or a combination of two or more of RRC message, MAC message, and PHY message.

In the efficiency information feedback procedure, one or more of information indicating that the transmission parameters need to be changed, changed transmission parameters (e.g., changed effective code rate), transmission parameters required to be changed, and a difference between the current transmission parameter and a target transmission parameter (e.g., a difference between the current effective code rate and a target effective code rate) may be fed back together with the efficiency information. Alternatively, information indicating up, down, or maintenance of the transmission parameter may be transmitted.

The terminal may transmit the information indicating whether it is necessary to change the transmission parameters to the base station. The base station may determine whether to apply the information received from the terminal, and may change the transmission parameters when application of the information is required.

A comparison criterion (e.g., metric) used to determine the efficiency of the transmission parameters may be a target error rate, throughput, latency, and/or transmission parameter. A value of the metric used to determine the efficiency of the transmission parameter may be calculated based on a quality of service (QoS) condition. The value of the metric used to determine the efficiency of the transmission parameter may be indicated by a higher layer. The value of the metric used to determine the efficiency of the transmission parameter may be preconfigured. For example, the base station may determine the value of the metric used to determine the efficiency of the transmission parameter, and inform the determined value to the terminal through a combination of one or more of system information, RRC message, MAC message, and PHY message. Alternatively, the terminal may determine the value of the metric used to determine the efficiency of the transmission parameter, and may inform the base station of the determined value through one or a combination of two or more of RRC message, MAC message, and PHY message.

(3) Feedback Method of Guide Information for Changing Transmission Parameters

The terminal may generate the statistical information on the decoding results and may transmit the efficiency information to the base station. In addition, the terminal may reconfigure the transmission parameters, and transmit the reconfigured transmission parameters (or guide information on the reconfigured transmission parameters) to the base station through one or a combination of two or more of RRC message, MAC message, and PHY message. The transmission time of the reconfigured transmission parameters (or guide information on the reconfigured transmission parameters) may be preconfigured. The base station may determine the transmission time of the reconfigured transmission parameters (or guide information on the reconfigured transmission parameters), and may inform the terminal of the determined transmission time through one or a combination of two or more of system information, RRC message, MAC message, and PHY message. Alternatively, the terminal may determine the transmission time of the reconfigured transmission parameters (or guide information on the reconfigured transmission parameters), and may inform the base station of the determined transmission time through one or a combination of two or more of RRC message, MAC message, and PHY message.

The guide information for changing the transmission parameters may be used as a guideline for determining a transmission parameter to be changed and/or a value of the transmission parameter to be changed. A transmission parameter transmitted as the guide information for changing the transmission parameter may be preconfigured. The base station may determine a transmission parameter used as the guide information for changing the transmission parameter, and may inform the terminal of the determined transmission parameter through one or a combination of two or more of system information, RRC message, MAC message, and PHY message. Alternatively, the terminal may determine a transmission parameter used as guide information for changing the transmission parameter, and may inform the base station of the determined transmission parameter through one or a combination of two or more of RRC message, MAC message, and PHY message.

In the guide information feedback procedure, at least one of the information indicating that the transmission parameters need to be changed, the changed transmission parameters, the transmission parameters required to be changed, and a difference between the current transmission parameter and the target transmission parameter may be fed back together with the guide information. Alternatively, information indicating up, down, or maintenance of the transmission parameter may be transmitted.

The terminal may transmit the guide information for changing the transmission parameters to the base station.

The base station may determine whether to apply the guide information received from the terminal, and may change the transmission parameters based on the guide information when it is necessary to apply the guide information.

For example, the metric used to determine whether the guide information of the transmission parameter is fed back may be the statistical information on the number (e.g., average number) of decoding successes occurring one or more aggregated transmission periods. In this case, if the average number of decoding successes in the aggregated transmission period exceeds 1, the terminal may determine that the transmission parameters need to be changed, and transmit the guide information of the transmission parameters to the base station. Here, the guide information may suggest an increase in the effective code rate. For example, the guide information may suggest a decrease of the aggregation factor among parameters related to the effective code rate. However, when the aggregation factor is already set to the minimum value, the guide information may suggest changing another parameter among the effective code rate related parameters. Here, conditions for determining that the transmission parameter needs to be changed may be variously changed. For example, the conditions may include 'whether the average number of decoding successes exceeds 1.5', 'whether the average number of decoding successes is equal to or greater than 2', and/or the like.

If the average number of decoding successes occurring in the aggregated transmission period is 1, the terminal may determine that it is not necessary to change the transmission parameters, and may not transmit the guide information to the base station. That is, the terminal may not perform an additional operation. Here, the conditions for determining that the transmission parameters need to be changed may be variously changed. For example, the conditions may include 'whether the average number of decoding successes is between 0.5 and 1.5', and/or the like.

If the average number of decoding successes in the aggregated transmission period is less than 1, the terminal may determine that the transmission parameter needs to be changed and transmit guide information of the transmission parameter to the base station. Here, the guide information may suggest a decrease in the effective code rate. For example, the guide information may suggest an increase in the aggregation factor among the effective code rate related parameters. However, when the aggregation factor is already set to the maximum value, the guide information may suggest changing other parameters among the effective code rate related parameters. Here, the conditions for determining whether the transmission parameters need to be changed may be variously changed. For example, the conditions may include 'whether the average number of decoding successes is less than 0.5', 'whether no decoding success occurs', and/or the like.

The above-described exemplary embodiment may be performed for not only the aggregation factor but also other parameters. In this case, an execution order or priority may be preconfigured. For example, the base station may determine the execution order or priority of the guide information generation/transmission operation, and inform the terminal of the determined execution order or the determined priority through one or a combination of one or more of system information, RRC message, MAC message, and PHY message. Alternatively, the terminal may determine the execution order or priority of the guide information generation/transmission operation, and inform the base station of the determined execution order or the determined priority through one or a combination of two or more of RRC message, MAC message, and PHY message.

Figure 8:
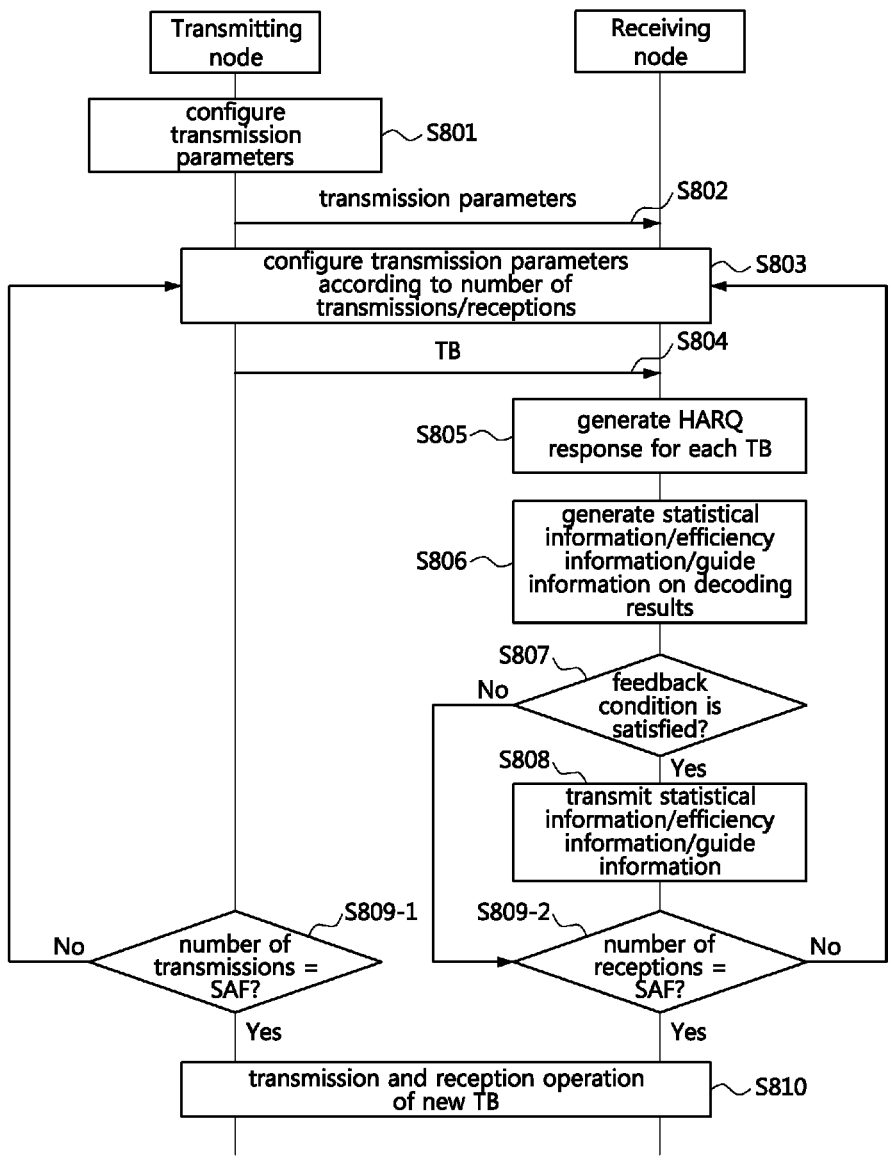
FIG. 8 is a sequence chart illustrating a third exemplary embodiment of a retransmission method in a communication system.

FIG. 8 is a sequence chart illustrating a third exemplary embodiment of a retransmission method in a communication system.

As shown in FIG. 8, a communication system (e.g., LTE communication system, NR communication system, and non-terrestrial network) may include a transmitting node and a receiving node. Each of the transmitting node and the receiving node may be configured identically or similarly to the communication node 300 shown in FIG. 3. The retransmission method shown in FIG. 8 may be performed based on the slot aggregation scheme. For example, the same TB may be repeatedly transmitted in an aggregated transmission period (e.g., slots indicated by the SAF). The TBs repeatedly transmitted in one aggregated transmission period may have different RVs.

The transmitting node may configure transmission parameters (S801). The transmission parameters may include an effective code rate related parameter and/or a HARQ related parameter. The transmitting node may transmit the transmission parameters to the receiving node (S802). The transmission parameters may be transmitted through one or a combination of two or more of system information, RRC message, MAC message, and PHY message. The receiving node may receive the transmission parameters from the transmitting node. The transmission parameters may be configured (e.g., updated) according to the number of transmissions or receptions of the TB (S803). For example, the transmitting node may configure the transmission parameters according to the number of transmissions of the TB in one aggregated transmission period, and the receiving node may configure the transmission parameters according to the number of receptions of the TB in one aggregated transmission period.

The transmitting node may transmit the TB to the receiving node based on the transmission parameters (S804). The transmitting node may repeatedly transmit the TB by the number indicated by the SAF in the aggregated transmission period. For example, the transmitting node may compare the number of transmissions of the TB and the SAF in the aggregated transmission period (S809-1). If the number of TB transmissions in the aggregated transmission period is less than the SAF, the transmitting node may reconfigure the transmission parameters according to the number of transmissions of the TB (S803), and transmit the TB to the receiving node based on the reconfigured transmission parameters (S804). On the other hand, if the number of transmissions of the TB in the aggregated transmission period is the same as the SAF, the transmitting node may terminate the transmission operation in the aggregated transmission period, and may perform a transmission operation (e.g., transmission operation for a new TB) in a new aggregated transmission period (S810). In the new aggregated transmission period, the transmission operation may be performed based on the steps S801, S802, S803, S804, and S809-1.

Meanwhile, the receiving node may perform a TB receiving operation based on the transmission parameters. For example, the receiving node may generate a decoding result of the TB (S805). The step S805 may be performed on a TB or slot basis. The receiving node may generate statistical information, efficiency information, and/or guide information on the decoding result (S806). The statistical information, efficiency information, and/or guide information may be generated based on the above-described scheme. The receiving node may determine whether a feedback condition of the information generated in the step S806 (e.g., statistical information, efficiency information, and/or guide information) is satisfied (S807).

For example, the feedback condition may be a transmission time. In this case, the receiving node may determine that the feedback condition is satisfied when a preconfigured transmission time is reached, and may transmit the statistical information, efficiency information, and/or guide information to the transmitting node at the preconfigured transmission time (S808). The information generated in the step S806 may be transmitted through one or a combination of two or more of RRC message, MAC message, and PHY message. As another example, the feedback condition may be a necessity of reconfiguring the transmission parameters. In this case, the receiving node may determine that it is necessary to reconfigure the transmission parameters based on the decoding result generated in the step S805 and/or the information generated in the step S806, and in this case, the statistical information, efficiency information, and/or guide information may be transmitted to the transmitting node (S808).

If the feedback condition is not satisfied, the statistical information, efficiency information, and/or guide information may not be transmitted. For example, when the feedback condition is not satisfied in one aggregated transmission period, the statistical information, efficiency information, and/or guide information may not be transmitted before the end of the one aggregated transmission period. Alternatively, the statistical information, efficiency information, and/or guide information may be transmitted regardless of the feedback condition. If the steps S806 to S808 are performed after the step S805, the entire communication procedure may be performed without a problem. The execution timing of the steps S806 to S808 may not be limited to the exemplary embodiment shown in FIG. 8.

The transmitting node may receive the statistical information, efficiency information, and/or guide information from the receiving node, and may reconfigure the transmission parameters in consideration of the statistical information, efficiency information, and/or guide information. The reconfigured transmission parameters may be transmitted to the receiving node. When the statistical information, efficiency information, and/or guide information are received from the receiving node before the end of the aggregated transmission period #n, the transmitting node may not apply the statistical information, efficiency information, and/or guide information to the transmission operation for the aggregated transmission period #n.

That is, the transmitting node may apply the statistical information, efficiency information, and/or guide information received in the aggregated transmission period #n to a transmission form a new aggregated transmission period (e.g., aggregated transmission period #n+k) after the aggregated transmission period #n. The transmission parameters for the aggregated transmission period #n+k may be configured in consideration of the statistical information, efficiency information, and/or guide information received in the aggregated transmission period #n. Here, each of n and k may be a natural number. Alternatively, the transmitting node may reconfigure the transmission parameters for the aggregated transmission period #n in consideration of the statistical information, efficiency information, and/or guide information received in the aggregated transmission period #n, and use the reconfigured transmission parameters to perform the transmission operation in the aggregated transmission period #n. The reconfigured transmission parameters may be transmitted to the receiving node.

Meanwhile, after performing the step S807 or S808, the receiving node may compare the number of receptions of the TB in the aggregated transmission period and the SAF (S809-2). If the number of receptions of the TB in the aggregated transmission period is less than the SAF, the receiving node may reconfigure the transmission parameters according to the number of receptions of the TB (S803), and may perform an operation of receiving the TB based on the reconfigured transmission parameters. On the other hand, if the number of transmissions of the TB in the aggregated transmission period is equal to the SAF, the receiving node may terminate the reception operation in the aggregated transmission period, and may perform a reception operation in a new aggregated transmission period (e.g., reception operation of a new TB (S810). In the new aggregated transmission period, the reception operation may be performed based on the steps S802 to S809-2.

Figure 9:
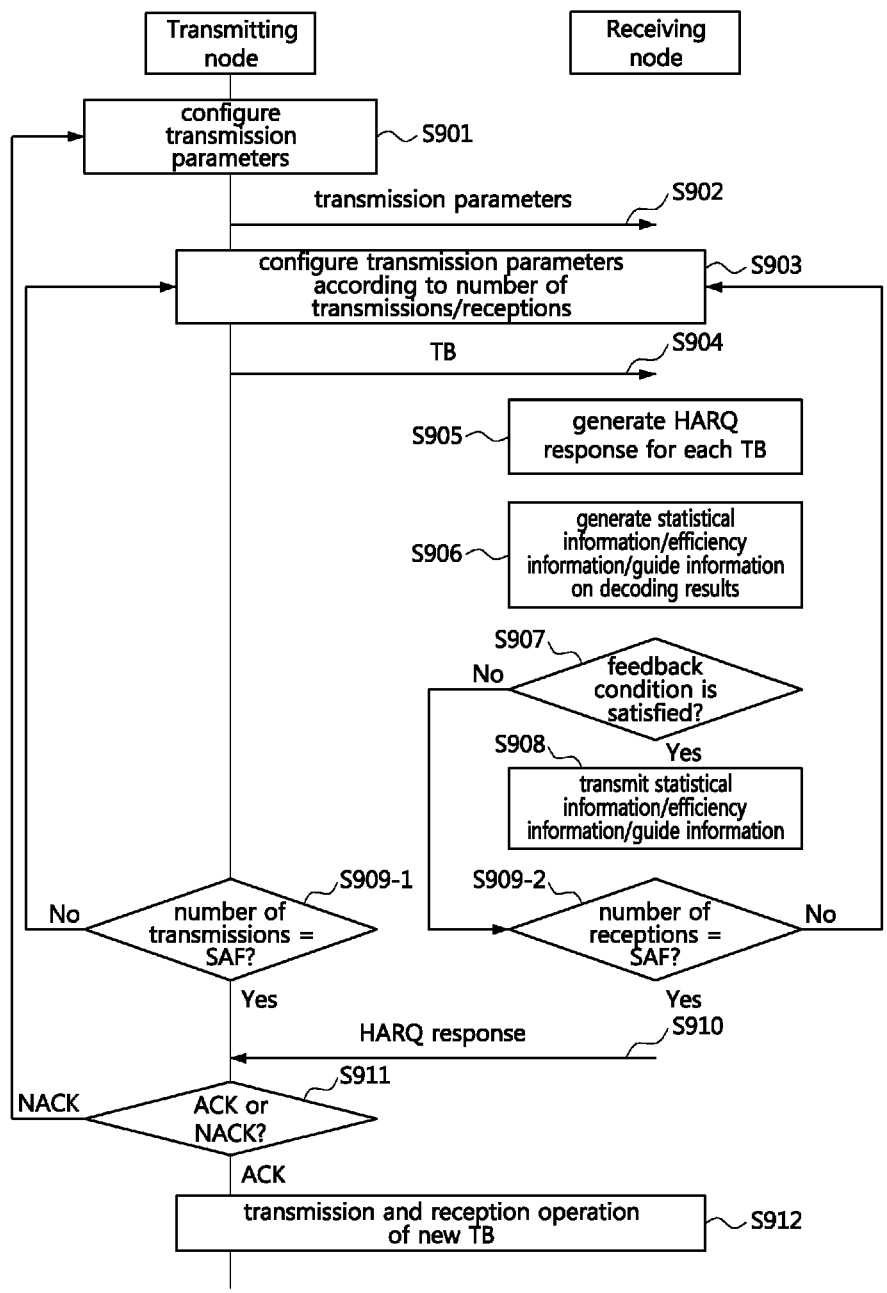
FIG. 9 is a sequence chart illustrating a fourth exemplary embodiment of a retransmission method in a communication system.

FIG. 9 is a sequence chart illustrating a fourth exemplary embodiment of a retransmission method in a communication system.

As shown in FIG. 9, a communication system (e.g., LTE communication system, NR communication system, and non-terrestrial network) may include a transmitting node and a receiving node. Each of the transmitting node and the receiving node may be configured identically or similarly to the communication node 300 shown in FIG. 3. The retransmission method shown in FIG. 9 may be performed based on the slot aggregation scheme. For example, the same TB may be repeatedly transmitted in an aggregated transmission period (e.g., slots indicated by the SAF). The TBs repeatedly transmitted in one aggregated transmission period may have different RVs.

Steps S901 to S909-2 shown in FIG. 9 may be performed in the same manner as the steps S801 to S809-2 shown in FIG. 8. The exemplary embodiment shown in FIG. 9 may further include 'an operation of transmitting and receiving a HARQ response for all TBs received in an aggregated transmission period' compared to the exemplary embodiment shown in FIG. 8.

For example, the receiving node may compare the number of receptions of the TB in the aggregated transmission period and the SAF. When the number of receptions of TBs in the aggregated transmission period is equal to the SAF, the receiving node may transmit the HARQ response for all TBs received in the aggregated reception period to the transmitting node (S910).

The HARQ response transmitted in the step S910 may include a decoding result for each of all TBs received in the aggregated transmission period. As another example, when the decoding results for all TBs received in the aggregated transmission period indicate CRC failure, the HARQ response transmitted in the step S910 may be NACK. As another example, when the decoding result for at least one TB received in the aggregated transmission period indicates CRC OK, the HARQ response transmitted in the step S910 may be ACK.

The transmitting node may receive the HARQ response from the receiving node, and may identify whether the HARQ response is ACK or NACK (S911). If the HARQ response is ACK, the transmitting node may determine that the TB transmitted in the step S904 has been successfully received by the receiving node, and may perform a new TB transmission operation in the next aggregated transmission period (S912). Alternatively, if a new TB does not exist in the transmitting node, the transmission operation of the TB may be terminated. On the other hand, when the HARQ response is NACK, the transmitting node may reconfigure the transmission parameters by performing the step S901 again, and may perform a retransmission operation of the TB based on the reconfigured transmission parameters. The receiving node that has transmitted the ACK in the step S910 may perform a new TB reception operation in the next aggregated transmission period (S912).

Meanwhile, if the steps S906 to S908 are performed after the step S905, the entire communication procedure may be performed without a problem. The execution timing of the steps S906 to S908 may not be limited to the exemplary embodiment shown in FIG. 9.

Figure 10:
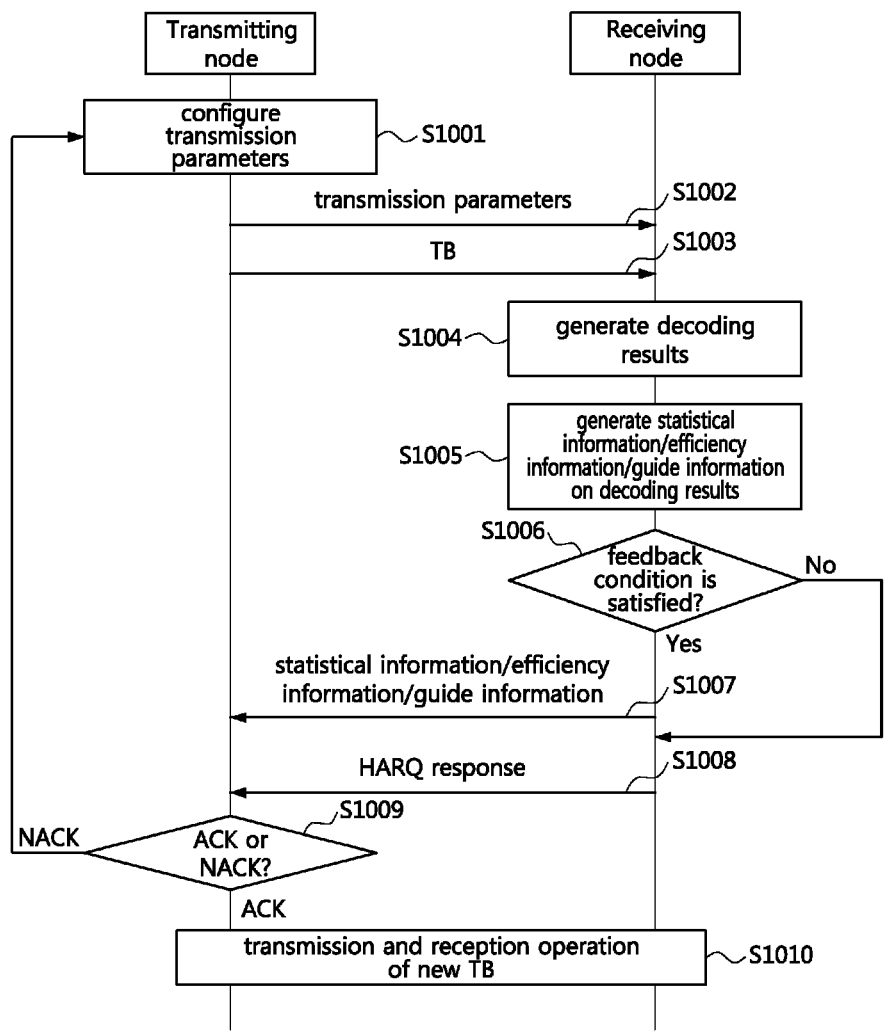
FIG. 10 is a sequence chart showing a fifth exemplary embodiment of a retransmission method in a communication system.

FIG. 10 is a sequence chart showing a fifth exemplary embodiment of a retransmission method in a communication system.

As shown in FIG. 10, a communication system (e.g., LTE communication system, NR communication system, and non-terrestrial network) may include a transmitting node and a receiving node. Each of the transmitting node and the receiving node may be configured identically or similarly to the communication node 300 shown in FIG. 3.

The retransmission method shown in FIG. 10 may be a general retransmission method rather than the blind retransmission method. That is, in the exemplary embodiment shown in FIG. 10, the slot aggregation scheme may not be used. Steps S1001 to S1004 shown in FIG. 10 may be performed in the same manner as the steps S501 to S504 shown in FIG. 5. The exemplary embodiment shown in FIG. 10 may further include steps S1005 to S1007 compared to the exemplary embodiment shown in FIG. 5. The steps S1005 to S1007 shown in FIG. 10 may be performed in the same manner as the steps S806 to S808 shown in FIG. 8.

Meanwhile, after performing the step S1006 or step S1007, the receiving node may transmit a HARQ response (e.g., ACK or NACK) for the TB to the transmitting node (S1008). In the exemplary embodiment shown in FIG. 10, since the HARQ response for the TB is transmitted, the steps S1005 to S1007 may be omitted. In this case, the step S1008 may be performed after the step S1004.

The transmitting node may receive the HARQ response from the receiving node, and may identify whether the HARQ response is ACK or NACK (S1009). If the HARQ response is ACK, the transmitting node may determine that the TB transmitted in the step S1003 has been successfully received by the receiving node, and may perform a transmission operation of a new TB (S1010). The transmission parameters for the new TB may be configured in consideration of statistical information, efficiency information, and/or guide information received from the receiving node. Alternatively, if a new TB does not exist in the transmitting node, the transmission operation of the TB may be terminated.

On the other hand, if the HARQ response is NACK, the transmitting node may reconfigure the transmission parameters by performing the step S1001 again, and may perform a retransmission operation of the TB based on the reconfigured transmission parameters. Here, the transmission parameters for retransmission of TB may be reconfigured in consideration of statistical information, efficiency information, and/or guide information received from the receiving node.

Meanwhile, if the steps S1005 to S1007 are performed after the step S1004, the entire communication procedure may be performed without a problem. The execution timing of the steps S1005 to S1007 may not be limited to the exemplary embodiment shown in FIG. 10. For example, if the steps S1005 to S1007 are performed only before the end of the TB, the entire communication procedure may be performed without a problem.

Meanwhile, in the above-described retransmission methods (e.g., the retransmission methods shown in FIGS. 5, 6, 8, 9, and/or 10), the information indicating enabling or disabling of the HARQ feedback operation may be configured as a separate transmission parameter. In this case, the retransmission method may be performed according to an enabled or disabled state of the HARQ feedback operation.

The HARQ feedback operation may be partially enabled or disabled by a specific granularity (e.g., a logical channel identifier (LCD), HARQ process). In this case, separate transmission parameters may be configured for each of the granularity, granularity subset, or granularity group, and the retransmission method may be managed. When the HARQ feedback operation is partially enabled or disabled, the HARQ response according to the enabled HARQ feedback operation may be applied to the disabled HARQ feedback operation.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first communication node in a communication system, the operation method comprising:
receiving transmission parameters from a second communication node;
transmitting a plurality of transport blocks (TBs) including a same data unit #1 to the second communication node based on the transmission parameters in an aggregated transmission period #n including a plurality of slots; and
receiving changed transmission parameters which are generated in consideration of statistical information from the second communication node,
wherein the statistical information are decoding results in the aggregated transmission period #n, the statistical information of the aggregated transmission period #n is used for determining an effective code rate applied to an aggregated transmission period #n+k including one or more slots after the aggregated transmission period #n, one or more TBs including a same data unit #2 are transmitted in the aggregated transmission period #n+k, each of the aggregated transmission periods #n and n+k is used for repeated transmission of a TB including a same data unit, and each of n and k is a natural number.

2. The operation method according to claim 1, further comprising transmitting the one or more TBs to the second communication node based on the changed transmission parameters in the aggregated transmission period #n+k.

3. The operation method according to claim 1, wherein the statistical information includes at least one of information indicating a number of decoding successes occurring in a plurality of aggregated transmission periods, information indicating a number of decoding failures occurring in the plurality of aggregated transmission periods, or information indicating a position of a first decoding success occurring in the plurality of aggregated transmission periods.

4. The operation method according to claim 1, wherein the statistical information includes at least one of information indicating a number of decoding successes occurring in the aggregated transmission period #n, information indicating a number of decoding failures occurring in the aggregated transmission period #n, or information indicating a position of a first decoding success occurring in the aggregated transmission period #n.

5. The operation method according to claim 1, wherein the same data unit #2 is different from the same data unit #1 which is transmitted in the aggregated transmission period #n.

6. A first communication node in a communication system, the first communication node comprising:
a processor,
wherein the processor causes the first communication node to:
receive transmission parameters from a second communication node;
transmit a plurality of transport blocks (TBs) including a same data unit #1 to the second communication node based on the transmission parameters in an aggregated transmission period #n including a plurality of slots; and
receive changed transmission parameters which are generated in consideration of statistical information from the second communication node,
wherein the statistical information are decoding results in the aggregated transmission period #n, the statistical information of the aggregated transmission period #n is used for determining an effective code rate applied to an aggregated transmission period #n+k including one or more slots after the aggregated transmission period #n, one or more TBs including a same data unit #2 are transmitted in the aggregated transmission period #n+k, each of the aggregated transmission periods #n and #n+k is used for repeated transmission of a TB including a same data unit, and each of n and k is a natural number.

7. The first communication node according to claim 6, further comprising transmitting the one or more TBs to the second communication node based on the changed transmission parameters in the aggregated transmission period #n+k.

8. The first communication node according to claim 6, wherein the statistical information includes at least one of information indicating a number of decoding successes occurring in a plurality of aggregated transmission periods, information indicating a number of decoding failures occurring in the plurality of aggregated transmission periods, or information indicating a position of a first decoding success occurring in the plurality of aggregated transmission periods.

9. The first communication node according to claim 6, wherein the statistical information includes at least one of information indicating a number of decoding successes occurring in the aggregated transmission period #n, information indicating a number of decoding failures occurring in the aggregated transmission period #n, or information indicating a position of a first decoding success occurring in the aggregated transmission period #n.

10. The first communication node according to claim 6, wherein the same data unit #2 is different from the same data unit #1 which is transmitted in the aggregated transmission period #n.

* * * * *